Patented Feb. 25, 1936

2,031,929

UNITED STATES PATENT OFFICE 2,031,929

IMPREGNATION OF MATERIALS

Wilhelm Breuers, Ludwigshafen-on-the-Rhine, Hermann Mark, Mannheim, and Erich Konrad, Leverkusen, Germany, assignors to I. G. Farbenindustrie Aktiengesellschaft, Frankfort-on-the-Main, Germany No Drawing. Application July 29, 1932, Serial No. 626,210. In Germany August 18, 1931

10 Claims. (Cl. 91—68)

The present invention relates to the impregnation of porous materials, particularly to sizing and dressing of textile materials, and to preparations therefor.

We have found that porous materials, particularly textile and like materials of any kind, can be provided with valuable impregnations, for example by sizing or dressing, by acting on the said materials with dispersions of sulphonation products of rubber materials, such as natural rubber, rubber-like products, obtained by a polymerization of diolefines, and the conversion or degradation products of rubber or of the said rubber-like products, or of similar sulphonation products of polymerized styrene. The said sulphonation products are soluble in water and may be employed as such or in the form of their alkali salts, that is in the form of their salts with alkali metals, alkaline earth metals, ammonia or organic bases. Salts of the said sulphonation products with organic bases, as for example alkylamines or hydroxyalkylamines, often have specific, good properties. The employment of the said water-soluble sulphonic acid bodies as the essential constituents of sizing and dressing preparations in the textile industry is especially advantageous because the size, or dressing, quite apart from its good action, is readily removable from the fabrics by means of water or of aqueous soap solutions, the alkali metal and alkylolamine salts being readily soluble in water and ethyl alcohol but insoluble in benzene or benzine. In most cases the sulphonation products are employed in quantities of from about 5 to about 50 grams per liter of the bath, about 10 grams being employed as an average.

The said sulphonic acids or their salts may also be employed together with other substances usually employed in the textile industry, such as for example soaps or products of the kind of Turkey red oil, or with other sulphuric acid esters of organic compounds, such as sulphuric esters of oleic and like acids or of alcohols such as octodecyl alcohol, or sulphonic acids, such as sulphonic acids of palmitic and like acids and bodies of the type of oleic N-methyl tauride, or with glue or other gelatinizing substances, or gum arabic, dextrine and like sizing agents. Generally these substances are employed in quantities of from about 0.5 to about 3 grams per litre of the bath. Mixtures of the said sulphonic acids or their salts together with organic solvents, waxes or wax-like substances, such as waxes of natural origin, bleached Montan wax or chlorinated diphenyl or naphthalene of a high content of chlorine, are also frequently suitable for the treatment of textiles, leather, paper and like fibrous materials.

Difficultly water-soluble salts of the sulphonation products may be employed as a finish; the fabrics are preferably soaked with a solution of the sulphonation product or an easily water-soluble salt thereof, such as the alkali metal salts, and then passed into, or through, a bath containing a metal salt giving difficultly soluble or water-insoluble metal salts with the sulphonation products, as for example aluminium acetate, so that the aluminium salt of the sulphonation product is precipitated on the fibres.

As specific initial materials for the preparation of the said sulphonation products may be mentioned for example india rubber or other rubber-like, highly polymeric products, as for example polymerization products of butadiene hydrocarbons, such as butadiene, isoprene, dimethylbutadiene, and like hydrocarbons. Conversion or degradation products of rubber, as for example partially hydrogenated rubber, as well as products which are obtained by the cyclization of rubber, are also suitable. The last mentioned products which may be obtained for example according to the British Patents Nos. 249,172 or 332,762 differ from rubber in that only a part of the double linkages originally present in the rubber remains unaltered, while the other part of the double linkages is saturated by internal conversion (cyclization).

The usual sulphonating agents, as for example concentrated sulphuric acid, oleum, chlorsulphonic acid or sulphur trioxide, are employed for the sulphonation, which may be carried out in the presence of inert, organic solvents or diluents, such as liquid esters or ethers, for example ethyl ether, dinormal-butyl ether or amyl acetate, in order to render the reaction milder. The duration of the action of the sulphonating agents as well as the temperature employed depend on the nature of the initial materials or of the sulphonating agents and may be readily ascertained by a preliminary test; for example when employing chlorosulphonic acid the temperature is generally between about 0° and 20° C. and the reaction is carried out for several hours at least until the product is soluble in water.

The following examples will further illustrate the nature of this invention but the invention is not restricted to these examples. The parts are by weight.

*Example 1*

1 part of ethyl ether and 3 parts of crêpe rubber are heated at from 250° to 260° C. in an autoclave for 48 hours. Ethyl ether is then added to the mixture until it may readily be filtered. After removing any insoluble matter by filtration the ether is distilled off and 68 parts of the cyclo-rubber thus prepared are dissolved in 200 parts of ethyl ether, and 40 parts of chlorsulphonic acid in 100 parts of ethyl ether are introduced into the solution at 0° C. The reaction mixture is kept at the said temperature for about half an hour and is then poured into a mixture of ice and water; the ethereal layer is removed and the aqueous solution of the sulphonic acid is neutralized by means of soda. By evaporating the neutral solution the sodium salt of the cyclo-rubber sulphonic acid is obtained together with sodium chloride and sodium sulphate.

From 10 to 50 grams of the readily soluble sodium salt of the cyclo-rubber sulphonic acid dissolved in 1 liter of water together with from one-fifth to one-third by weight of the sodium salt of dextrine or glue constitute very good sizing agents for artificial silk, such as viscose silk, the size being readily removable from the fabrics by washing with water, if necessary with the employment of a little soap.

Example 2

A mixture of 400 parts of chlorsulphonic acid and 100 parts of ethyl ether is slowly stirred at room temperature into a solution of 200 parts of over-masticated crêpe rubber in 800 parts of ethyl ether. The rubber sulphonic acid separates in coarse flocks which are washed with ethyl ether until the ether is free from mineral acid and dried in vacuo. The sodium salt is obtained by dissolving the sulphonic acid in water and adding caustic soda solution until the solution is neutral and then evaporating the solution. It is an excellent sizing agent. 20 parts of viscose silk are treated for 5 minutes in a bath consisting of a solution of 10 parts of the sodium salt of the rubber sulphonic acid in 990 parts of water; the silk is then centrifuged and dried at about 60° C. For sizing silk from acetyl cellulose a 3 per cent solution of the sodium salt is preferred.

The silk is very well sized and elastic; the single fibres of the silk are closed together, whereas the threads, which remain loose, can easily be wound on reels and weaved on the loom. The sizing can be removed without difficulty from the weaved piece of cloth.

The sizing bath may also contain other sizing agents, in addition to the aforesaid sodium salt of rubber sulphonic acid, for example soluble starch, dextrine or glue. Plastifying agents, such as Turkey red oils or hydroscopic substances, such as glycerol or sodium sulphate, may also be added to the sizing bath, as well as from one-fifth to one-third of the sulphonic salt of magnesium chloride or calcium chloride.

Fats and oils, such as vegetable oils or fats and mineral oils, may be easily emulsified by means of the rubber sulphonic acids which may also act as protective colloids. Since the rubber sulphonic acids are not precipitated from their aqueous solutions by alkaline earth metal hydroxides, water of any degree of hardness may be employed for preparing the sizing bath.

By replacing the sodium salt by the corresponding triethanol amine salt a very effective dressing bath is obtained. Artificial silk from viscose treated in such a bath as described above is rendered considerably smooth and soft in touch.

Example 3

A solution of 2000 parts of crêpe rubber in 10,000 parts of cyclohexane is heated at 280° C. for 30 minutes in an autoclave together with 1000 parts of a catalyst consisting of 200 parts of metallic nickel precipitated on Florida earth, after pressing in hydrogen up to a pressure of 50 atmospheres. The rubber is thus hydrogenated to the extent of about 60 per cent. The catalyst is removed by filtration and the solvent is distilled off in vacuo. 250 parts of the partially hydrogenated rubber thus obtained are dissolved in 600 parts of ethyl ether and a mixture of 148 parts of chlorosulphonic acid with 400 parts of ethyl ether is stirred into the solution at a temperature between 5° and 10° C. After several hours the whole is poured into water, the ether is removed and the aqueous solution is neutralized by means of soda.

The salt in admixture with sodium chloride and a little sodium sulphate may be recovered by evaporation. The product is a good sizing agent.

Example 4

10 parts of polymeric styrene, obtainable for example by polymerizing styrene while heating to about 150° C., are dissolved in 100 parts of chloroform. 6 parts of chlorsulphonic acid are allowed to flow into the solution while stirring at 20° C. below zero centigrade. The reaction mixture is further stirred until a sample of the product is completely soluble in water. The whole is then poured into a mixture of ice and water, the solvent is distilled off and the resulting solution neutralized with an aqueous solution of caustic soda or sodium carbonate. The sodium salt of the resulting sulphonic acid is eminently suitable as a sizing and dressing agent.

The said sulphonic acid of polymeric styrene is also suitable for dressing as such. A very good dressing is obtained for example by impregnating a fabric from viscose silk with a solution of the sulphonic acid or its sodium salt and subsequently fixing the sulphonic acid by treatment with an aqueous solution of aluminium acetate.

70 parts of a 10 per cent aqueous solution of the sodium salt of the said or of a rubber sulphonic acid are kneaded for from 1 to 2 hours with 5 parts of oleic N-methyl tauride sodium salt until the mixture is homogeneous. The vessel is then warmed and a quantity of water is evaporated sufficient to obtain a practically solid product after cooling. The product resembling solid soap can be moulded by pressing and is soluble in water, but is more resistant to abrasion than the usual solid soaps and may find useful application as a textile soap or also toilet soap after addition of the usual perfumes.

Instead of the tauride sodium salt the sodium salts of the acid sulphuric esters from octodecyl alcohol or oleic alcohol may be employed.

What we claim is:—

1. The process of impregnating porous articles which comprises acting thereon with a dispersion of a water-soluble sulphonic acid body selected from the group consisting of sulphonic acids of rubber materials, sulphonic acids of polymerized styrene and of water-soluble salts of said sulphonic acids.

2. The process of impregnating porous articles which comprises acting thereon with a dispersion of a water-soluble sulphonic acid body, selected from the group consisting of sulphonic acids of rubber materials, sulphonic acids of polymerized styrene and of water-soluble salts of said sulphonic acids, and then with a solution of a water-soluble alkaline earth metal salt.

3. Preparations, suitable for impregnating porous materials, comprising essentially a water-soluble sulphonic acid body selected from the group consisting or sulphonic acids of rubber materials, sulphonic acids of polymerized styrene and of water-soluble salts of said sulphonic acids.

4. Aqueous preparations, suitable for impregnating porous materials, comprising from about 0.5 to about 5 per cent by weight of a water-soluble sulphonic acid body selected from the group consisting of sulphonic acids of rubber materials, sulphonic acids of polymerized styrene and of water-soluble salts of said sulphonic acids.

5. Aqueous preparations, suitable for impregnating porous materials, comprising from about 0.5 to about 5 per cent by weight of a water-soluble sulphonic acid body selected from the group consisting of sulphonic acids of rubber materials and of water-soluble salts of said sulphonic acids.

6. Aqueous preparations, suitable for impregnating porous materials comprising from about 0.5 to about 5 per cent by weight of a rubber sulphonic acid sodium salt.

7. The process of impregnating textile materials which comprises acting thereon with a dispersion of a water-soluble sulphonic acid body selected from the group consisting of sulphonic acids of rubber materials and of water-soluble salts thereof.

8. The process of impregnating textile materials which comprises acting thereon with a dispersion of a water-soluble sulphonic acid body, selected from the group consisting of sulphonic acids of rubber materials and of water-soluble salts thereof and then with a solution of a water-soluble alkaline earth metal salt.

9. The process of impregnating textile materials which comprises acting thereon with from about 0.5 to about 5 per cent dispersion of a water-soluble sulphonic acid body selected from the group consisting of sulphonic acids of rubber materials and of water-soluble salts thereof.

10. The process of impregnating textile materials which comprises acting thereon with from about 0.5 to about 5 per cent aqueous dispersion of a water-soluble sulphonic acid body selected from the group consisting of sulphonic acids of rubber materials and of water-soluble salts thereof.

WILHELM BREUERS.
HERMANN MARK.
ERICH KONRAD.